United States Patent
Hanna et al.

(10) Patent No.: US 6,748,809 B2
(45) Date of Patent: Jun. 15, 2004

(54) LOAD MONITORING SYSTEMS AND METHODS

(75) Inventors: Douglas S. Hanna, Mystic, CT (US); David H. Whittemore, Yarmouthport, MA (US); Richard Madden, Groton, MA (US)

(73) Assignee: BBNT Solutions LLC, Cambridge, MA (US)

( * ) Notice: Subject to any disclaimer, the term of this patent is extended or adjusted under 35 U.S.C. 154(b) by 99 days.

(21) Appl. No.: 10/228,669

(22) Filed: Aug. 26, 2002

(65) Prior Publication Data

US 2004/0035215 A1 Feb. 26, 2004

(51) Int. Cl.$^7$ ................................................. G01B 7/16
(52) U.S. Cl. ..................................................... 73/779
(58) Field of Search .......................... 73/779, 781, 818, 73/862.041, 862.042, 862.043, 862.045, 862.046

(56) References Cited

U.S. PATENT DOCUMENTS

| | | | | |
|---|---|---|---|---|
| 3,913,396 A | | 10/1975 | Elliot | ........................ 73/143 |
| 5,359,902 A | | 11/1994 | Barger et al. | .......... 73/862.626 |
| 5,675,094 A | * | 10/1997 | Klauber et al. | ........ 73/862.191 |
| 5,932,815 A | | 8/1999 | Dodds | .................... 73/862.393 |
| 6,345,544 B1 | * | 2/2002 | Mizuno et al. | .......... 73/862.69 |
| 6,591,688 B2 | * | 7/2003 | Wright | ........................ 73/728 |

OTHER PUBLICATIONS

Variable Reluctance Pressure Sensing Technology: Theory of Operation–VR Pressure Transducers, http://www.validyne.com/theory.htm, Jul. 16, 2002; 3 pages.
Jetty Load Monitoring Systems—Monitoring Services (UK) Limited: Jetty Load Monitoring Systems, http://www.msl.ision.co.uk/jetty systems.htm, Jul. 16, 2002, 5 pages.
BBN Technologies: Offshore Oil Platform Instrumentation, approximately 1996, 13 pages.

* cited by examiner

Primary Examiner—Max Noori
(74) Attorney, Agent, or Firm—Ropes & Gray LLP (57) ABSTRACT

A system (200) monitors a load associated with a load carrying member. The system (200) may include a voltage divider (240) and a computer device (250). The voltage divider (240) measures inductance associated with load sensing elements (210) that monitor the load carrying member. The computer device (250) determines displacements of the load sensing elements (210) based on the inductance associated with the load sensing elements (210) and determines the load associated with the load carrying member based on the displacements of the load sensing elements (210). The system may be designed to be portable and/or DC powered.

30 Claims, 9 Drawing Sheets

FIG. 9 ized with the load sensing elements, and determine the load associated with the load carrying member based on the displacements of the load sensing elements.

LOAD MONITORING SYSTEMS AND METHODS

BACKGROUND OF THE INVENTION

1. Field of the Invention

The present invention relates generally to load monitoring and, more particularly, to systems and methods for signal conditioning and processing of load monitoring signals 2. Description of Related Art Load and tension monitoring of load carrying members are very important in some applications. For example, load and tension monitoring of moorings and risers is important in offshore oil production platforms. One such monitoring system includes variable reluctance sensors placed around the periphery of a load carrying member to measure the load associated with that member. This system uses a resonant circuit to process signals from the sensors and report results to a marine monitoring system.

The electronics used in such a system are sophisticated and expensive. The electronics are typically housed in a fixed cabinet and powered by an AC line voltage. Therefore, the electronics are rendered inoperable in the event of line voltage failure, which may occur in critical situations, such as in a severe storm.

As a result, there is a need for a monitoring system that is inexpensive, portable, and/or capable of being powered by DC power.

SUMMARY OF THE INVENTION

Systems and methods consistent with the present invention address this and other needs by providing a monitoring system that is inexpensive, portable, and/or capable of being powered by DC power.

In accordance with the principles of the invention as embodied and broadly described herein, a system monitors a load associated with a load carrying member. The system may include a voltage divider and a computer device. The voltage divider measures inductance associated with load sensing elements that monitor the load carrying member. The computer device determines displacements of the load sensing elements based on the inductance associated with the load sensing elements and determines the load associated with the load carrying member based on the displacements of the load sensing elements.

In another aspect of the invention, a portable load monitoring system monitors the load associated with a load carrying member. The system includes a voltage divider and a portable computer device. The voltage divider is configured to measure inductance associated with load sensing elements that are associated with the load carrying member. The portable computer device is configured to determine displacements of the load sensing elements due to the load based on the inductance associated with the load sensing elements, and determine the load associated with the load carrying member based on the displacements of the load sensing elements.

In a further aspect of the invention, a system monitors a load associated with a load carrying member. The system includes a voltage divider and a computer device connected to a DC power source. The voltage divider is configured to measure inductance associated with load sensing elements associated with the load carrying member. The computer device is configured to determine displacements of the load sensing elements due to the load based on the inductance

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide load monitoring that may be used to monitor the load associated with load carrying members, such as moorings and risers of offshore oil production platforms. The systems and methods may include inexpensive circuitry with DC power capability. In certain critical situations, such as in a severe storm, uncertainty in the determination of the load associated with a load carrying member may be unacceptable. The DC power capability permits the monitoring to occur in situations, such as where there is AC line voltage failure.

The systems and methods consistent with the present invention also provide a portable, compact configuration for deployment to remote locations. Field personnel can use the portable configuration as a diagnostic and/or troubleshooting tool to quickly localize problems at various points in the cabling. In other implementations, the portable configuration may be enclosed in a protective container and deployed for load measurements at locations, such as in underwater mooring and riser systems at or near the sea floor.

Exemplary Environment

Figure 1:
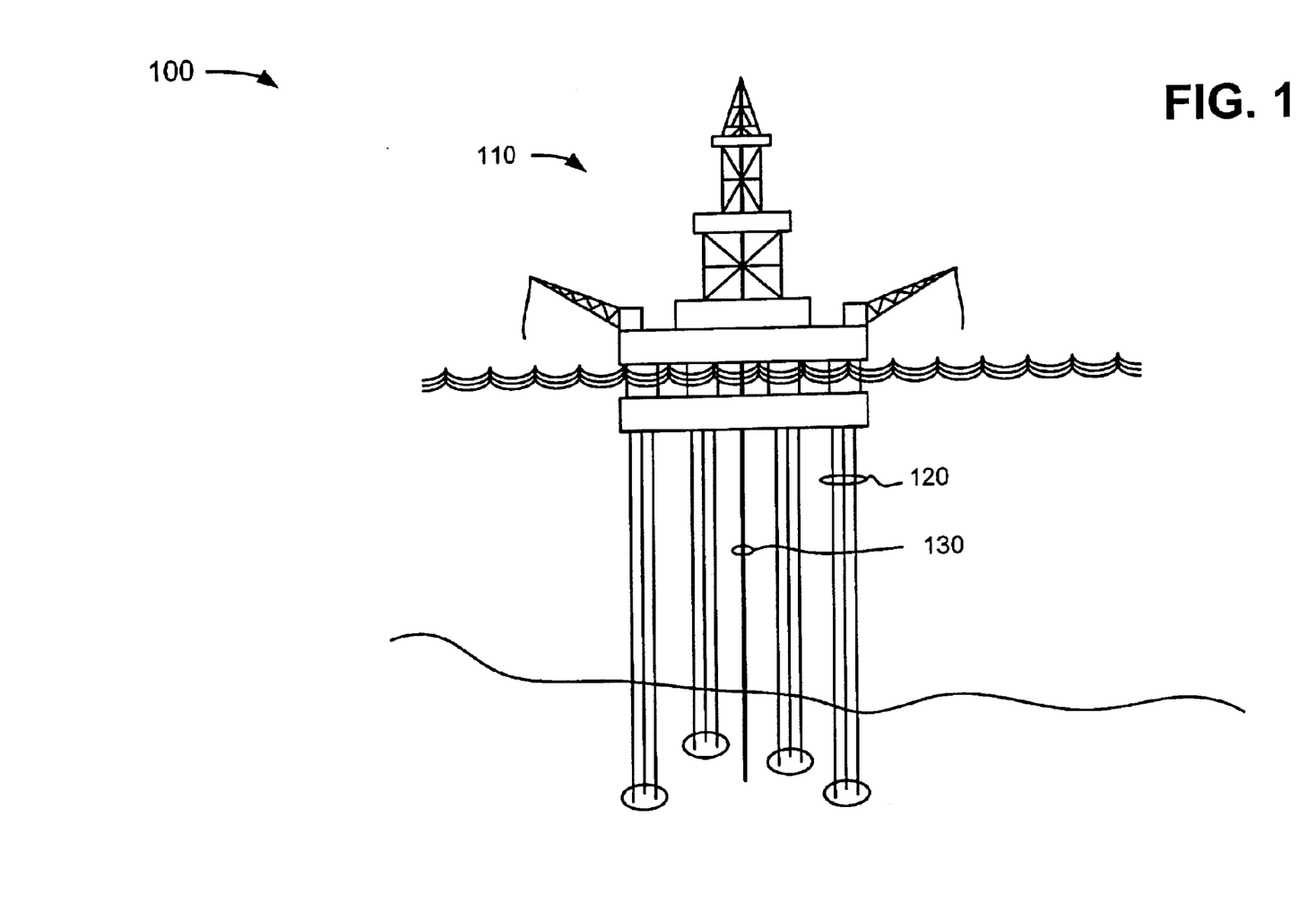
FIG. 1 is an exemplary diagram of an environment in which systems and methods consistent with the present invention may be implemented.

FIG. 1 is an exemplary environment 100 in which systems and methods consistent with the principles of the invention may be implemented. As shown in FIG. 1, environment 100 may be associated with a floating production system, such as a floating offshore oil platform 110. Platform 110 may be secured to the sea floor via chains or tendons, such as moorings 120. Oil, gas, and/or water may be extracted and provided to platform 110 and/or exported via one or more tubes, such as riser 130. It may be important to monitor the load and tension associated with moorings 120 and riser 130 to make sure that moorings 120 and riser 130 are not loose or overstrained, possibly, to the point of breakage, and that platform 110 is stable.

While systems and methods consistent with the principles of the invention will be described within environment 100, such systems and methods are not so limited. In fact, systems and methods consistent with the present invention may be used in any environment where it may be useful to monitor the load of a load carrying member.

Exemplary Load Measurement Unit Configuration

Figure 2:
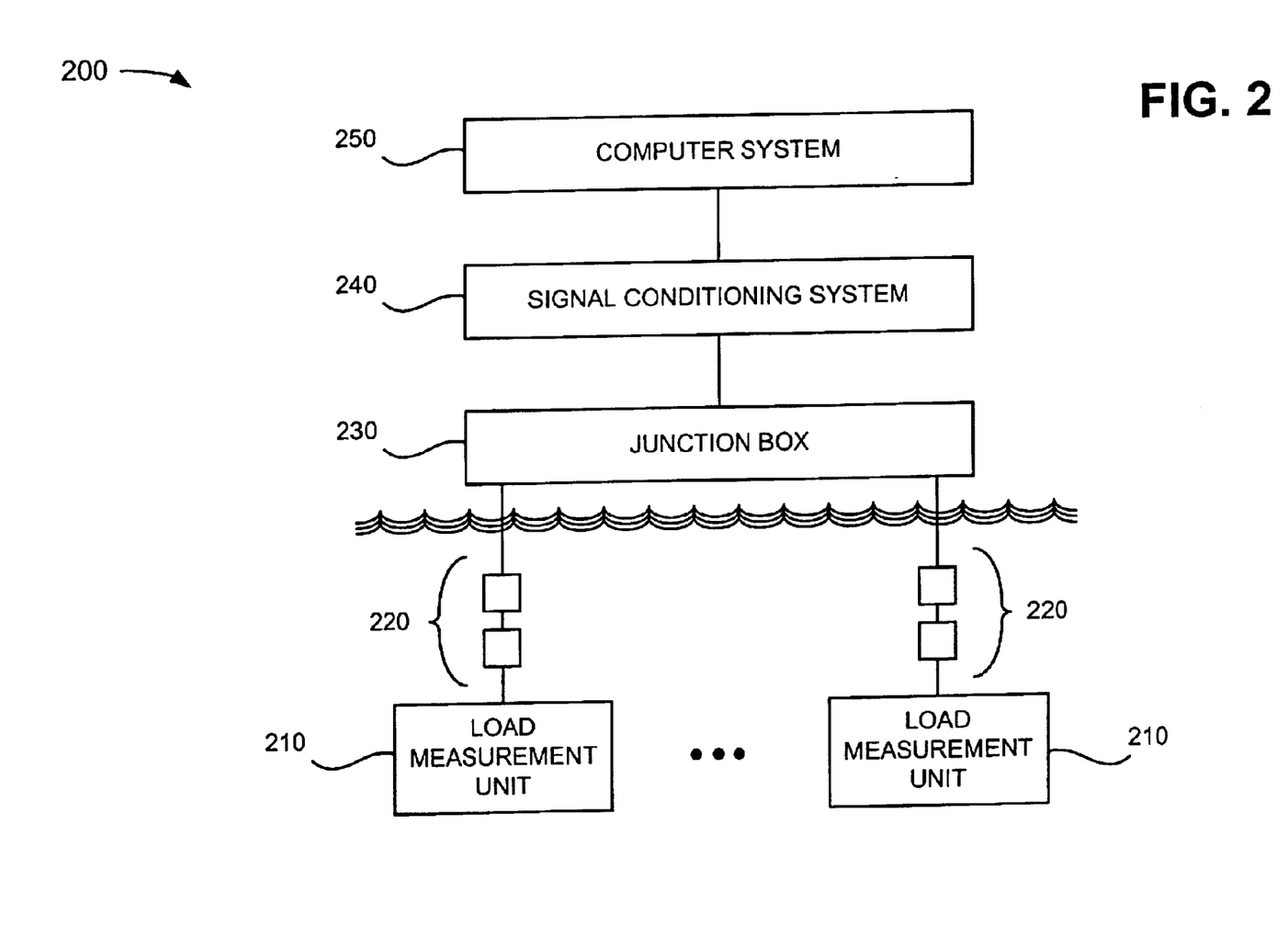
FIG. 2 is an exemplary diagram of a system in which systems and methods consistent with the present invention may be implemented.

FIG. 2 is an exemplary diagram of a system 200 in which systems and methods consistent with the principles of the invention may be implemented. System 200 includes one or more load measurement units 210, one or more cables 220, junction box 230, signal conditioning system 240, and computer system 250. Computer system 250 and/or signal conditioning system 240 may be powered by AC power or DC power, such as a battery (not shown). The DC power permits computer system 250 and/or signal conditioning system 240 to operate in the event of AC power failure.

Generally, load measurement unit 210 may generate signals indicative of displacement associated with a tendon or tube, such as mooring 120 or riser 130. Cable 220 may connect load measurement unit 210 to junction box 230 within platform 110. Cable 220 may include one or more underwater connectors. Junction box 230 may provide connection points between one or more load measurement units 210 and signal conditioning system 240. A typical platform 110 may include one or more junction boxes 230.

Signal conditioning system 240 may gather data for determining inductance associated with load measurement unit 210 based on the signals from load measurement unit 210. Computer system 250 may determine the inductance associated with a load measurement unit 210 and, from this, the load associated with mooring 120 or riser 130. For example, computer system 250 may determine tension, bending, and orientation of bending associated with mooring 120 or riser 130.

These components will now be described in more detail.

Load Measurement Unit

Figure 3:
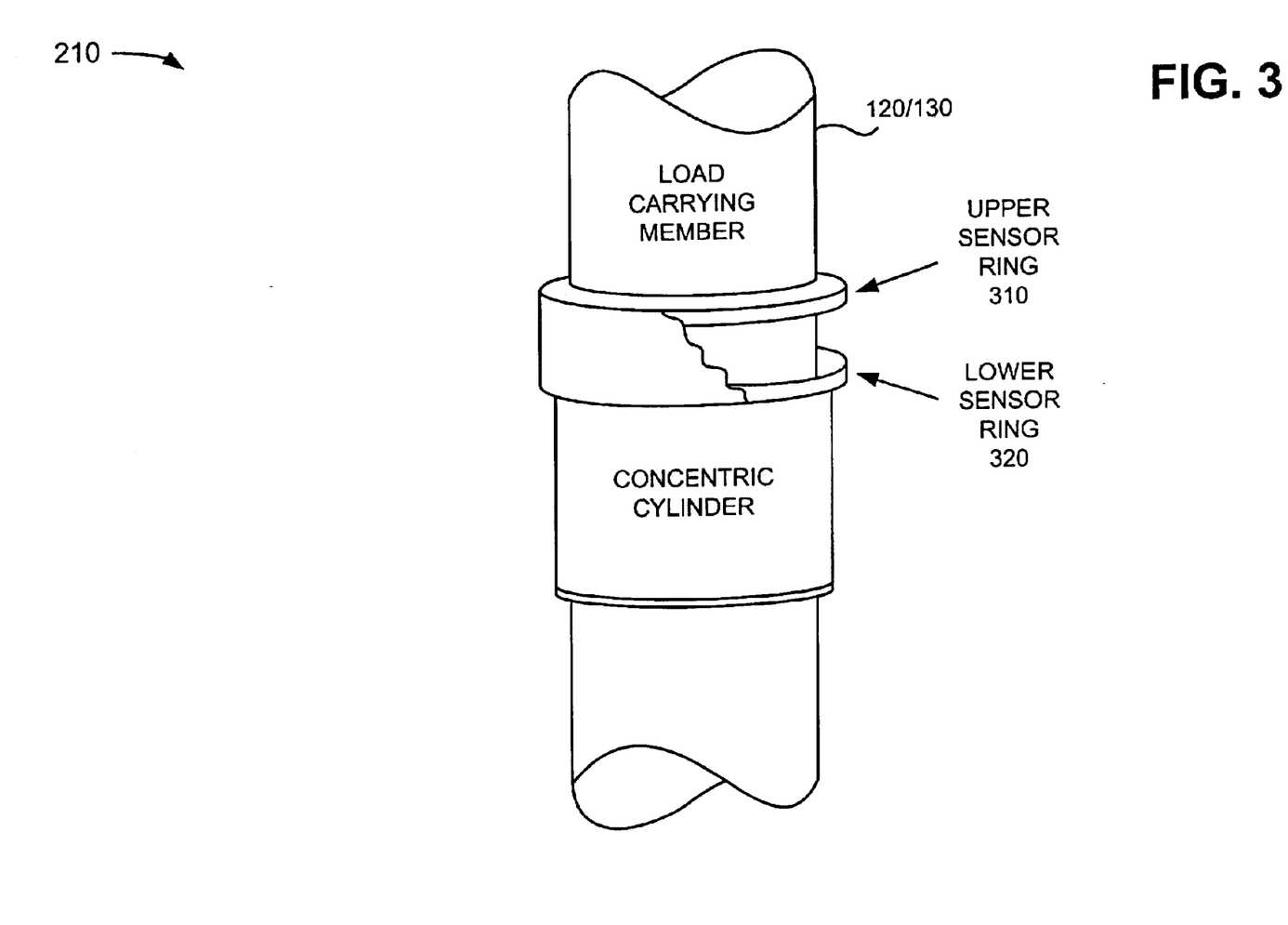
FIG. 3 is an exemplary diagram of the load measurement unit of FIG. 2 according to an implementation consistent with the present invention.

FIG. 3 is an exemplary diagram of load measurement unit 210 according to an implementation consistent with the principles of the invention. Load measurement unit 210 may be located on a load carrying member, such as mooring 120 or riser 130, approximately 100 or more feet underwater. Load measurement unit 210 may include upper sensor ring 310 and lower sensor ring 320 that form rings around the periphery of the load carrying member. Load measurement unit 210 may generate signals indicative of the displacement between upper sensor ring 310 and lower sensor ring 320.

Figure 4:
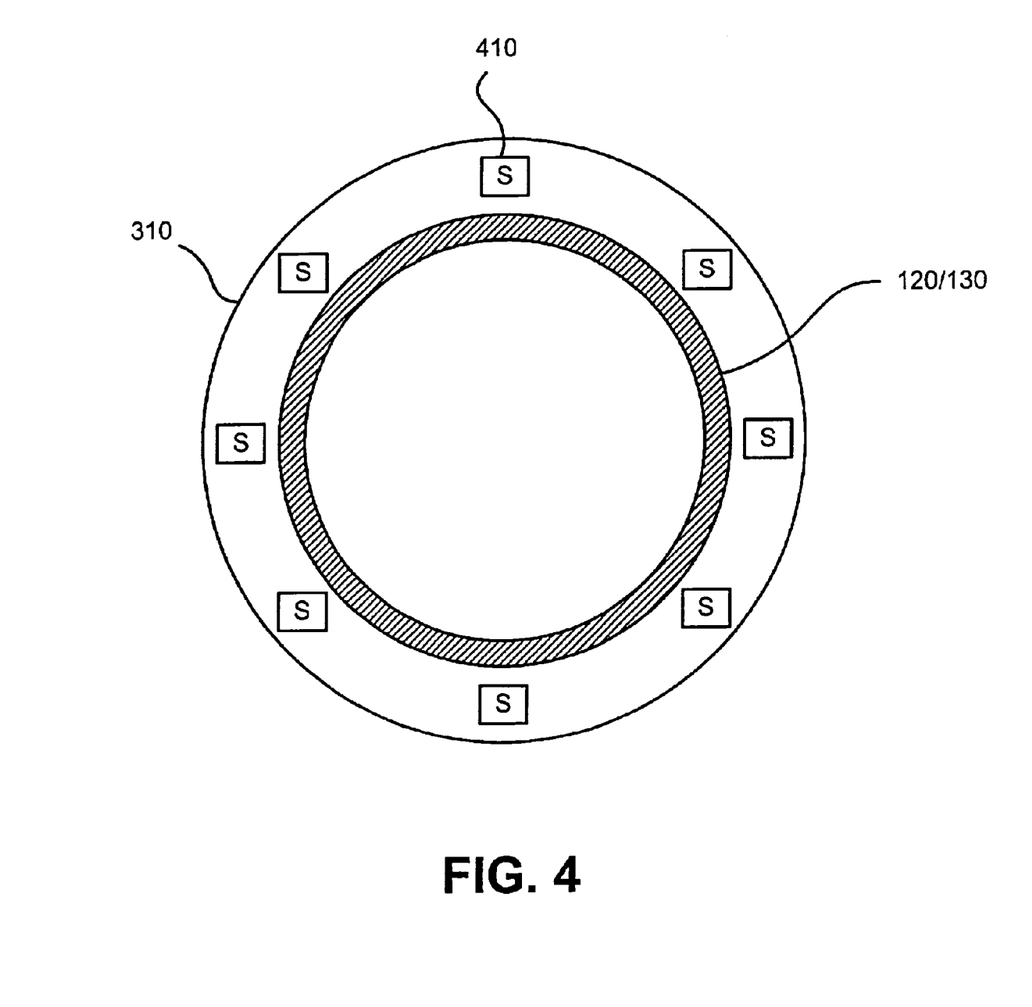
FIG. 4 is an exemplary diagram of the upper sensor ring of FIG. 3 according to an implementation consistent with the present invention.

FIG. 4 is an exemplary diagram of upper sensor ring 310 according to an implementation consistent with the principles of the invention. Sensor ring 310 may include approximately three to twelve load sensing elements, such as sensors 410, located around the periphery of the load carrying member (e.g., mooring 120 or riser 130). The actual number of sensors 410 included may be a number sufficient to obtain good estimates of tension, bending, and the orientation of the bending of the load carrying member.

Figure 5:
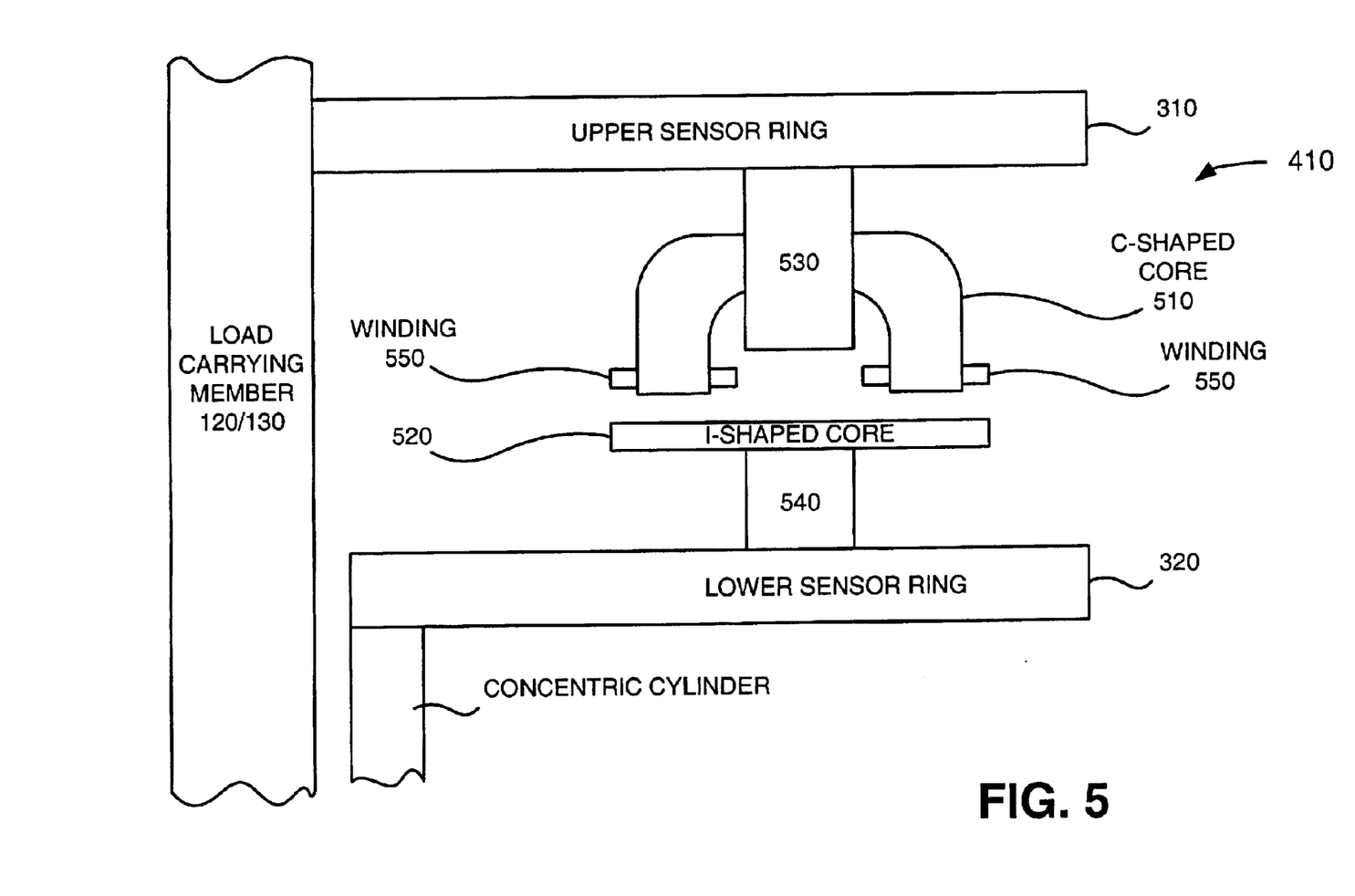
FIG. 5 is an exemplary diagram of a sensor of FIG. 4 according to an implementation consistent with the present invention.

FIG. 5 is an exemplary diagram of a section of sensor 410 according to an implementation consistent with the principles of the invention. Sensor 410 may include a variable reluctance sensor or capacitive sensor. Sensor 410 may include C-shaped magnetic core 510, I-shaped magnetic core 520, brackets 530 and 540, and windings 550. C-shaped magnetic core 510 may be constructed, for example, of a highly permeable laminated transformer material. C-shaped core 510 may be mounted on upper sensor ring 310 via bracket 530 with the ends of the C-shape pointed downward or in a direction generally parallel to the direction of force within the load carrying member.

I-shaped magnetic core 520 may be constructed, for example, of a highly permeable laminated transformer material. I-shaped magnetic core 520 may be mounted on lower sensor ring 320 via bracket 540. I-shaped core 520 may be positioned so that narrow gaps exist between each end of C-shaped core 510 and a facing portion of I-shaped core 520. In an implementation consistent with the principles of the invention, the widths of the gaps are small as compared with any transverse dimension of the ends of C-shaped core 510. Further, the cross-sectional dimensions or areas of the ends of C-shaped core 510 may be smaller than those of the facing portion of I-shaped core 520.

A winding 550 may be mounted around each end of C-shaped core 510 closely adjacent to the respective gap. Windings 550 may connect in series so that their electromotive forces add. As will be understood by those skilled in the art, C-shaped core 510 and I-shaped core 520 may be highly permeable and, thus, the gaps between cores 510 and 520 may constitute most of the reluctance in the magnetic circuit linking windings 550. Thus, the inductance exhibited may be directly dependent on the widths of the gaps in the direction of the magnetic flux in the gaps (i.e., the vertical direction in FIG. 5).

As an axial load is applied to sensor 410, the width of the respective gap between each end of C-shaped core 510 and the adjacent portion of I-shaped core 520 increases or reduces. As the gaps are reduced, the inductance exhibited increases.

Both of the gaps may be used in determining the value of inductance. As a result, small increases in the length of one gap can compensate or offset for small decreases in the length of the other gap. Accordingly, sensor 410 may be relatively insensitive to bending moments applied thereto (i.e., around a horizontal axis perpendicular to the paper as illustrated in FIG. 5). Bending moments around the orthogonal horizontal axis lying in the plane of the paper only produce changes in width as a function of displacement across the surfaces of the ends of both gaps but not changes in the average width of each gap, to a first order approximation.

Cable

Cable 220 may include a marine cable that connects load measurement unit 210 to junction box 230 within platform 110. Cable 220 may include conductors that connect to sensors 410 of load measurement unit 210. Cable 220 may also include one or more underwater connectors with active or inactive components to relay signals between segments of cable 220.

Junction Box

Junction box 230 may include a set of connection points that connect cables 220 to signal conditioning system 240. One or more junction boxes 230 may be located within platform 110. For example, one junction box 230 may be located in the control room of platform 110 and another junction box 230 may be located in the lower regions of platform 110, such as where cables 220 come into platform 110.

Signal Conditioning System

Figure 6:
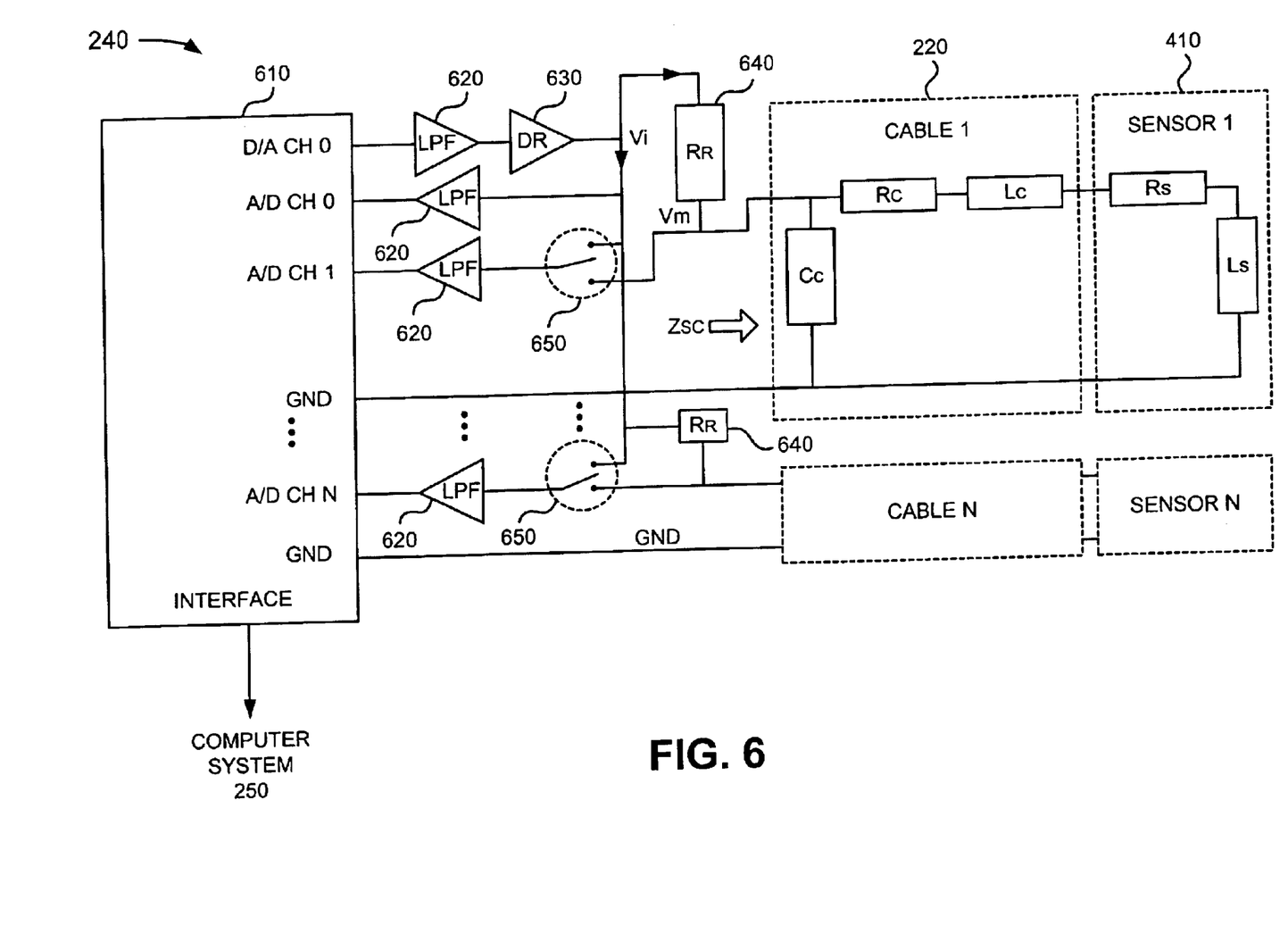
FIG. 6 is an exemplary detailed diagram of the signal conditioning system of FIG. 2 according to an implementation consistent with the present invention.

FIG. 6 is an exemplary diagram of signal conditioning system 240 according to an implementation consistent with the principles of the invention. Signal conditioning system 240 may gather data for determining the inductance and the operational status of sensors 410 and communicate this data to computer system 250.

Signal conditioning system 240 may include interface 610, filters 620, driver 630, resistors 640, and switches 650. Interface 610 is shown as a component of signal conditioning system 240. In an alternate implementation, interface 610 may be part of computer system 250.

Interface 610 may include a Personal Computer Memory Card International Association (PCMCIA) interface that facilitates the connection of signal conditioning system 240 to computer system 250. Interface 610 may include one or more digital-to-analog (D/A) channels that may be used to operate components of signal conditioning system 240. If interface 610 includes more than one D/A channel, each D/A channel may correspond to a different one of sensors 410.

Interface 610 may also include one or more analog-to-digital (AID) channels that may be used to capture data, such as data used in determining the inductance of a sensor 410. In the example of FIG. 6, interface 610 includes N+1 A/D channels that correspond to N different ones of sensors 410. A/D channel 0 may be used for calibrations and data acquisition, as will be described in more detail below. Interface 610 may also include ground (GND) connections.

Filters 620 may include conventional low pass filters that are designed to remove noise and aliased components of the signal. Driver 630 may include a sensor line driver that drive signals from the D/A channel.

Resistors 640 may be reference resistors (RR) having a known resistance. Switches 650 may include calibration switches that are used to switch the components of signal conditioning system 240 between calibration and data acquisition modes. As shown in FIG. 6, switches 650 may be in the up position during the calibration mode.

Signal conditioning system 240 may view sensor 410 and cable 220 as a combination of resistors, capacitors, and inductors. For example, cable 220 may be represented by a capacitor $C_C$, a resistor $R_C$, and an inductor $L_C$. The features of cable 220 may be measured and remain constant. Therefore, the capacitance, resistance, and inductance of cable 220 are known. Sensor 410 may be represented by a resistor $R_S$ and an inductor $L_S$. The resistance of sensor 410 may be measured and remain constant. The inductance of sensor 410 is a variable inductance that changes based on changes in displacement, as described above. The impedance of cable 220 and sensor 410 may be represented by $Z_{SC}$.

Signal conditioning system 420 uses a voltage divider circuit made up of the resistor $R_R$ and impedance $Z_{SC}$ to gather data for determining the inductance of sensor 410. The transfer function TF of the voltage divider may be represented by:

$$TF \equiv \frac{Vm}{Vi} = \frac{Z_{SC}}{R_R + Z_{SC}},$$

where Vi refers to a reference voltage input and Vm refers to a response voltage sample. The sensor and cable impedance $Z_{SC}$ may be represented by:

$$Z_{SC} = \frac{Z_{CC}(R_C + Z_{LC} + R_S + Z_{LS})}{Z_{CC} + R_C + Z_{LC} + R_S + Z_{LS}},$$

where $Z_{CC}$ refers to the impedance of the capacitance of cable capacitor $C_C$, $Z_{LC}$ refers to the impedance of cable inductor $L_C$, and $Z_{LS}$ refers to the impedance of sensor inductor $L_S$. From these equations, the impedance of inductor $L_S$ ($Z_{LS}$) can be determined. The inductance of inductor $L_S$ may then be determined from the following:

$$L_S = \left( \frac{R_R}{(1/TF - 1) - R_R/Z_{CC}} - R_C - R_S \right) \Big/ j\omega - L_C.$$

Signal conditioning system 240 provides the measurements used in determining the transfer function TF in the above equation to computer system 250 via the appropriate one(s) of the A/D channels.

Computer System

Computer system 250 may include a computer device, such as a personal computer, laptop, personal digital assistant, etc. To make system 200 portable, computer system 250 may include a portable device, such as a laptop or a personal digital assistant. Computer system 250 may determine inductance, displacement, and load associated with a load carrying member, such as mooring 120 or riser 130. Computer system 250 may determine displacement at a number of different locations around the periphery of the load carrying member. Computer system 250 may convert determined sensor inductance values to displacement due to tension and displacement due to bending.

Computer system 250 may calibrate the components of signal conditioning system 240 in the calibration mode. For example, switches 650 and the A/D channels may be placed into the calibration mode. Computer system 250 may output a reference signal via the D/A channel. Computer system 250 may then determine magnitude and phase corrections for all channels relative to the reference A/D channel 0.

Thereafter, during the data acquisition mode, computer system 250 may obtain the measurements for determining the transfer functions for the voltage dividers from signal conditioning system 240. Computer system 240 may use the transfer functions to determine the inductance of sensors 410. For a given inductance value, computer system 240 may estimate the corresponding displacement for sensor 410 based on prior calibrations of that sensor 410.

Figure 7:
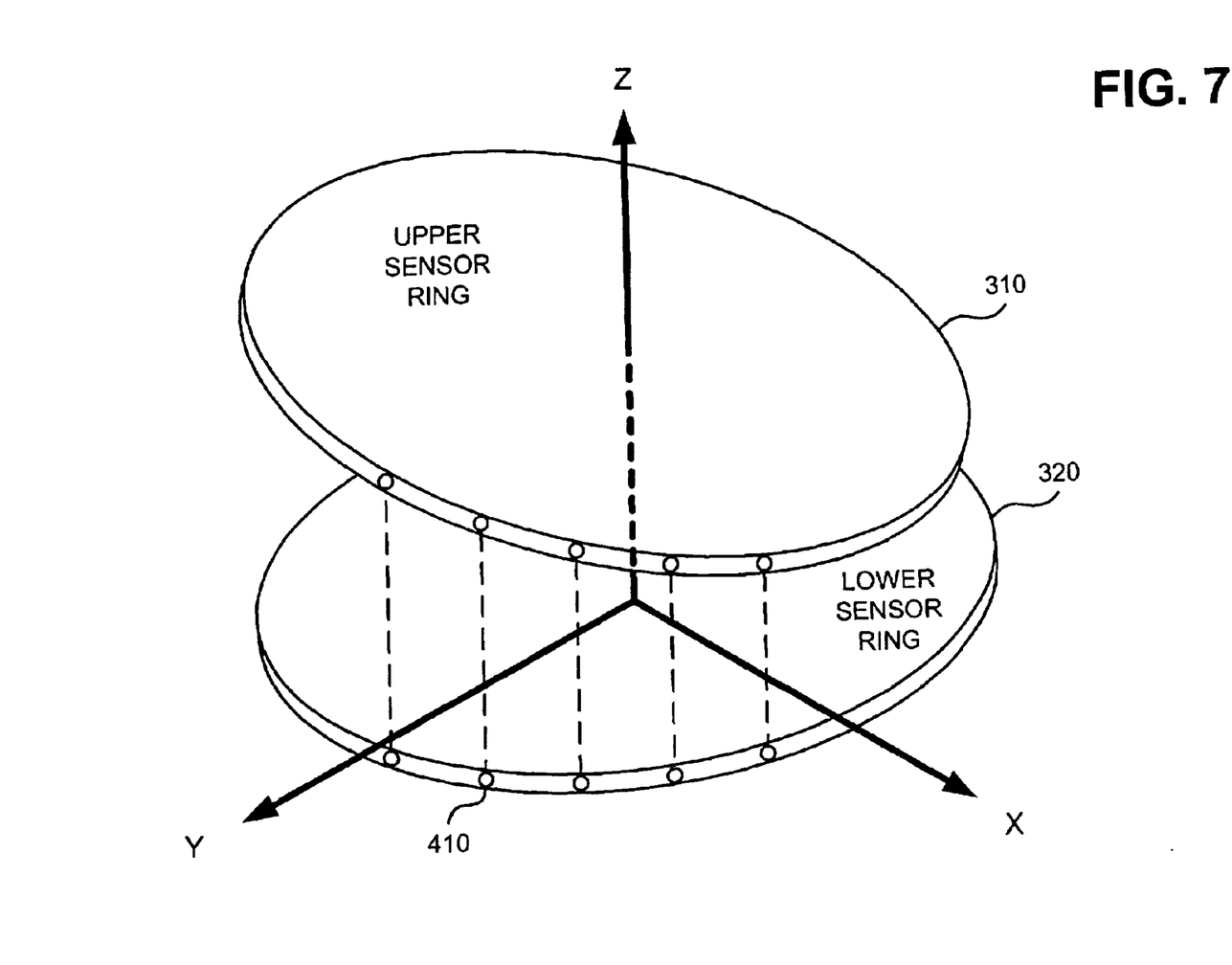
FIG. 7 is an exemplary diagram of a sensor plane that may be constructed to facilitate determination of displacement according to an implementation consistent with the principles of the invention.

Computer system 250 may then determine displacement due to tension and displacement due to bending. FIG. 7 is an exemplary diagram of a sensor plane that may be constructed to facilitate determination of displacement according to an implementation consistent with the principles of the invention.

Computer system 250 may determine the displacement of each sensor 410 based on its inductance and then subtract out the displacement for that sensor 410 under zero load. As a result, computer system 250 may determine just how much each sensor 410 is displaced under load. The displacement of a sensor(i) may be represented by:

$$Z_i = Ax_i + By_i + C,$$

where $x_i$ and $y_i$ are positions of sensor(i) in the X and Y planes, respectively; A and B are displacement components due to bending; and C is a displacement component due to tension. Computer system 250 may use a Least Mean Square process, or another process, to identify a plane through the displacements:

$$E = \sum_{i=1}^{N} [Z_i - (Ax_i + By_i + C)]^2.$$

Once the variables A, B, and C are known, then computer system 250 may determine tension, bending, and orientation of bending associated with riser 130. Tension (T) may be determined based on:

$$T = K_{axial} C,$$

where $K_{axial}$ may refer to a stiffness value associated with load measurement unit 210. Bending (Be) may be determined based on:

$$Be = K_{bend} \sqrt{A^2 + B^2},$$

where $K_{bend}$ may refer to a bending stiffness value associated with load measurement unit 210. A load measurement unit 210 may be calibrated beforehand to determine values for $K_{axial}$ and $K_{bend}$. Orientation of bending may be determined based on A and B (i.e., the displacement components due to bending).

Computer system 250 may present information to an operator via a graphical user interface. The display parameters of the graphical user interface may include individual sensor status, inductance, and calculated load, tension and bending values associated with a load carrying member (instantaneous or averaged), and/or other information that may be useful to the operator.

Exemplary Processing

Figure 8:
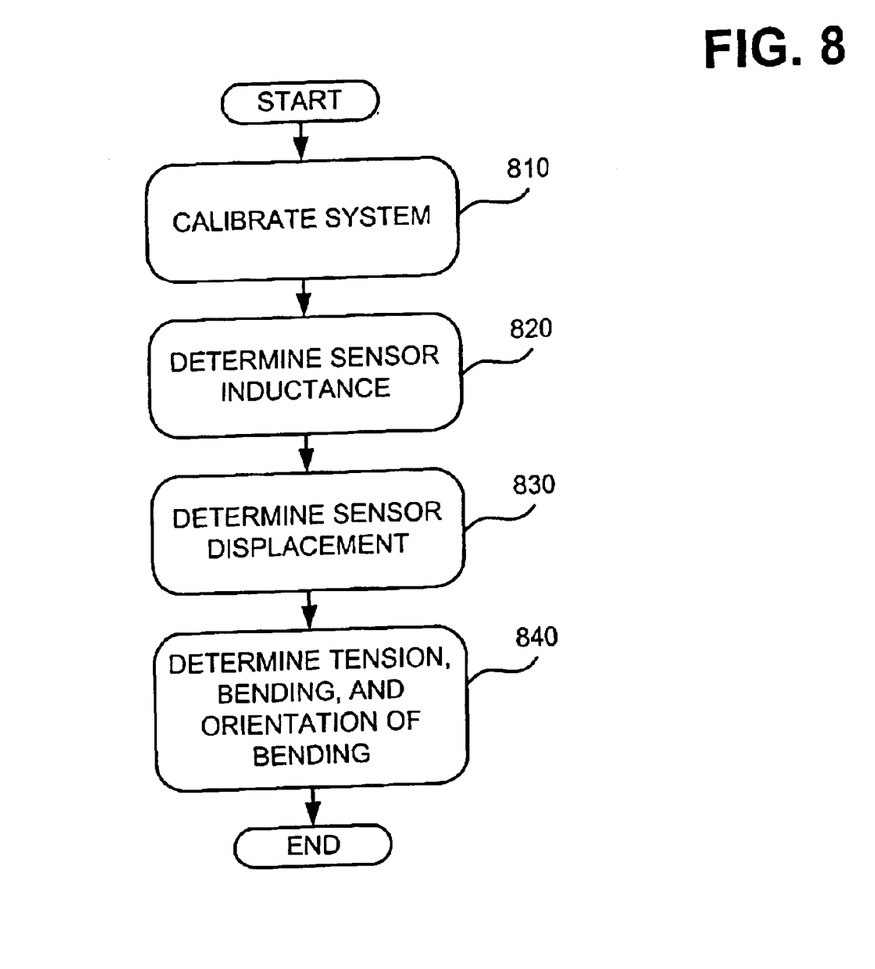
FIG. 8 is a flowchart of exemplary processing for determining tension, bending, and orientation of bending associated with a load carrying member according to an implementation consistent with the present invention.

FIG. 8 is a flowchart of exemplary processing for determining tension, bending, and orientation of bending associated with a load carrying member, such as a mooring 120 or riser 130, according to an implementation consistent with the present invention. Processing may begin with the calibration of the components of signal conditioning system 240 (act 810). Computer system 250 may instruct signal processing system 240 to enter the calibration mode. Computer system 250 may then input digitized data via the D/A channel of interface 610 and simultaneously calibrate the components of signal conditioning system 240 to determine magnitude and phase corrections for all of the channels relative to the reference A/D channel 0.

Thereafter, computer system 250 may instruct signal processing system 240 to enter the data acquisition mode. In the data acquisition mode, sensor inductance may be determined using the voltage divider of signal conditioning system 240 (act 820). For example, the D/A channel of interface 610 may apply a band-limited random or sine input to the cable ends through driver 630. The reference voltage input (Vi) and the response voltage samples (Vm) may then be measured at the A/D channels of interface 610. Reference voltage input (Vi) may be measured at the A/D channel 0 and the reference voltage samples (Vm) may be simultaneously measured at the A/D channels 1–N.

Computer system 250 may perform a discrete Fourier transform on the data obtained during the calibration mode and the data obtained during the data acquisition mode at the excitation frequency. Computer system 250 may divide the complex amplitude of the data from each of the channels obtained during the data acquisition mode by the complex amplitude of the data from each of the channels obtained during the calibration mode to obtain a set of N complex transfer functions TF. The TF values may be used in the equation for $L_S$ (identified above) to obtain the inductance of each sensor 410.

Once sensor inductance has been determined, sensor displacement may be determined (act 830). Sensor displacement may be estimated from information gathered during the previously-conducted sensor calibrations. The displacements of several sensors 410 may then be used to construct a plane through the displacements using a Least Mean Square algorithm, as described above. Construction of the plane may facilitate the determination of the displacement components due to bending and tension, as described above.

Once the displacement components due to bending and tension are determined, the tension, bending, and orientation of bending associated with the load carrying member may be determined (act 840). As described above, the tension may be determined based on a stiffness value and the displacement component due to tension. As also described above, the bending may be determined based on a bending stiffness value and the displacement components due to bending, and the orientation of bending may be determined based on the displacement components due to bending.

Load Cell Configuration

Thus far, a load measurement unit has been described as the vehicle for measuring the load associated with a load carrying member, such as a mooring or riser. In an alternate implementation consistent with the principles of the invention, a load cell may be used. In this load cell configuration, one or more load cells may be associated with each load carrying member. Instead of being located along the periphery of the load carrying member, the load cells are connected to the load carrying member at a point where the load carrying member connects to something else, like the platform. Like the load measurement unit, the load cells measure the load associated with the load carrying member.

Figure 9:
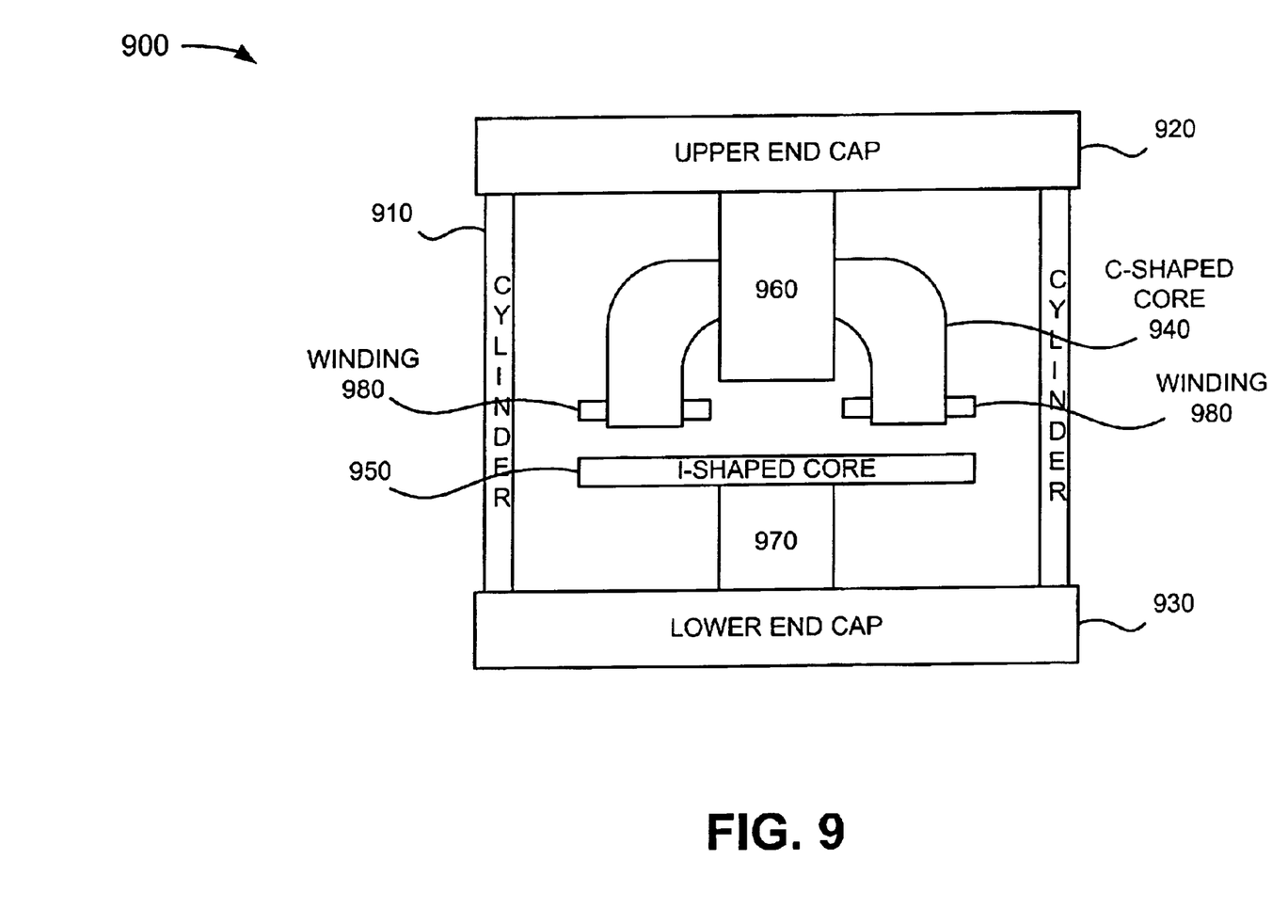
FIG. 9 is an exemplary diagram of a sensor according to another implementation consistent with the principles of the invention.

FIG. 9 is an exemplary diagram of a sensor 900 according to an implementation consistent with the principles of the invention. Sensor 900 may include a variable reluctance sensor, such as the one described in U.S. Pat. No. 5,359,902. Sensor 900 may include a hollow cylinder 910 connected to rigid end caps 920 and 930. Hollow cylinder 910 may be of circular cross-section and act as an elastic element for forces applied in a direction along the axis of cylinder 910. Cylinder 910 may, for example, be constructed of a high grade steel that has a very repeatable and essentially linear elasticity. Cylinder 910 may act essentially as a lossless spring. While the spring constant will typically be very high as understood by those skilled in the art, the forces intended to be measured may also be quite high.

End caps 920 and 930 connect to the ends of cylinder 910. In another implementation consistent with the present invention, end caps 920 and 930 are not separate from, but are integral with, cylinder 910. At least one of end caps 920 and 930 may connect to the load carrying member.

Within cylinder 910, sensor 900 may include C-shaped magnetic core 940, I-shaped magnetic core 950, brackets 960 and 970, and windings 980. C-shaped magnetic core 940 may be constructed, for example, of a highly permeable laminated transformer material. C-shaped core 940 may be mounted on upper end cap 920 via bracket 960 with the ends of the C-shape pointed downward or in a direction generally parallel to the direction of force within the wall of cylinder 910.

I-shaped magnetic core 950 may be constructed, for example, of a highly permeable laminated transformer material. I-shaped magnetic core 950 may be mounted on lower end cap 930 via bracket 970. I-shaped core 950 may be positioned so that narrow gaps exist between each end of C-shaped core 940 and a facing portion of I-shaped core 950. In an implementation consistent with the principles of the invention, the widths of the gaps are small as compared with any transverse dimension of the ends of C-shaped core 940. Further, the cross-sectional dimensions or areas of the ends of C-shaped core 940 may be smaller than those of the facing portion of I-shaped core 950.

A winding 980 may be mounted around each end of C-shaped core 940 closely adjacent to the respective gap. Windings 980 may connect in series so that their electromotive forces add. As will be understood by those skilled in the art, C-shaped core 940 and I-shaped core 950 may be highly permeable and, thus, the gaps between cores 940 and 950 may constitute most of the reluctance in the magnetic circuit linking windings 980. Thus, the inductance exhibited may be directly dependent on the widths of the gaps in the direction of the magnetic flux in the gaps (i.e., the vertical direction as shown in FIG. 9).

As an axial load is applied to sensor 900, cylinder 910 compresses or expands and the width of the respective gap between each end of C-shaped core 940 and the adjacent portion of I-shaped core 950 reduces or increases. As the gaps are reduced, the inductance exhibited increases.

Because the facing portion of I-shaped core 950 opposite each end of C-shaped core 940 is broader in transverse dimensions than the facing end of the C-shaped core 940, the inductance value of sensor 900 may be insensitive to small displacements of C-shaped core 940 in directions transverse to the axis of cylinder 910 and to the widths of the gaps. Both of the gaps may be used in determining the value of inductance. As a result, small increases in the length of one gap can compensate or offset for small decreases in the length of the other gap. Accordingly, sensor 900 may be relatively insensitive to bending moments applied thereto (i.e., around a horizontal axis perpendicular to the paper as illustrated in FIG. 9). Bending moments around the orthogonal horizontal axis lying in the plane of the paper only produce changes in width as a function of displacement across the surfaces of the ends of both gaps but not changes in the average width of each gap, to a first order approximation.

In this load cell configuration, sensor 900 may connect to a signal conditioning system and a computer system, which may be configured and operate similar to signal conditioning system 240 (FIG. 2) and computer system 250 described above.

Conclusion

Systems and methods consistent with the present invention may provide portable signal conditioning and signal processing components for variable reluctance load measurement. The systems and methods determine inductance and operational status of sensors used to measure the load of a load carrying member, converts the sensor inductance into displacement, and performs a Least Mean Square process to identify a plane through the displacements. The systems and methods may use this information to determine tension, bending, and orientation of bending associated with the load carrying member.

Systems and methods consistent with the principles of the invention may be configured with a laptop computer to provide a portable load measurement device or as a compact standalone device for deployment to remote areas or areas that are not easily accessible. For example, the compact standalone device may be remotely operable and capable of being placed within a pressure vessel for deployment at or near the sea floor.

Further, systems and methods consistent with the present invention include inexpensive circuitry that is amenable to operation on both line AC power and DC battery power. The DC power capability makes the systems and methods operable in the event of line voltage failure that may occur in critical situations, such as during a severe storm.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 8, the order of the acts may differ in other implementations consistent with the present invention. For another example, load forces upon the load sensors or load cells need not be vertical. The load sensors or load cells may operate in any orientation relative to Earth vertical.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A system that monitors a load associated with a load carrying member, a plurality of load sensing elements that monitor the load carrying member, the system comprising:
    a voltage divider configured to measure inductance associated with the load sensing elements; and
    a computer device configured to:
        determine displacements of the load sensing elements based on the inductance associated with the load sensing elements, and
        determine the load associated with the load carrying member based on the displacements of the load sensing elements.

2. The system of claim 1, wherein the voltage divider includes:
    a reference resistor, and
    an impedance determined based on at least a resistor and an inductor corresponding to the load sensing elements.

3. The system of claim 2, wherein the load sensing elements connect to the computer device via a plurality of cables; and
    wherein the impedance is determined further based on a resistor, a capacitor, and an inductor corresponding to the cables.

4. The system of claim 2, wherein the inductor corresponding to the load sensing elements includes a variable inductor with an inductance that changes based on changes in displacement of the load sensing elements.

5. The system of claim 1, wherein when determining the load, the computer device is configured to:
   identify a plane through the displacements using a Least Mean Square process, and
   determine the load associated with the load carrying member using the plane.

6. The system of claim 1, wherein the load associated with the load carrying member includes tension and bending associated with the load carrying member.

7. The system of claim 6, wherein the tension is determined based on a stiffness value and a displacement component due to tension.

8. The system of claim 6, wherein the bending is determined based on a bending stiffness value and one or more displacement components due to bending.

9. The system of claim 6, wherein the load associated with the load carrying member further includes orientation of bending associated with the load carrying member.

10. The system of claim 9, wherein the orientation of bending is determined based on a plurality of displacement components due to bending.

11. The system of claim 1, wherein the system is a portable system and the computer device includes a portable computer device.

12. The system of claim 1, further comprising:
   a DC power supply configured to provide power to the voltage divider and the computer device.

13. The system of claim 1, wherein the voltage divider and the computer device operate in an absence of AC line voltage.

14. A system for monitoring a load associated with a load carrying member, a plurality of load sensing means that monitor the load carrying member, the system comprising:
   means for determining inductance associated with the load sensing means using voltage division;
   means for determining displacement of the load sensing means based on the inductance associated with the load sensing means; and
   means for determining the load associated with the load carrying member based on the displacement of the load sensing means.

15. A method for monitoring a load associated with a load carrying member, a plurality of sensors that monitor the load carrying member, the method comprising:
   measuring inductance associated with each of the sensors using voltage division;
   determining displacements of the sensors based on the inductance associated with each of the sensors; and
   determining the load associated with the load carrying member based on the displacements of the sensors.

16. The method of claim 15, wherein the voltage division uses a reference resistance and an impedance that is determined based on at least a resistance and an inductance corresponding to the sensors.

17. The method of claim 16, wherein the inductance corresponding to the sensors includes a variable inductance that changes based on changes in displacement of the sensors.

18. The method of claim 15, further comprising:
   identifying a plane through the displacements using a Least Mean Square process.

19. The method of claim 18, wherein the determining the load includes:
   using the plane to determine the load associated with the load carrying member.

20. The method of claim 15, wherein the load associated with the load carrying member includes tension and bending associated with the load carrying member.

21. The method of claim 20, wherein the tension is determined based on a stiffness value and a displacement component due to tension.

22. The method of claim 20, wherein the bending is determined based on a bending stiffness value and one or more displacement components due to bending.

23. The method of claim 20, wherein the load associated with the load carrying member further includes orientation of bending associated with the load carrying member.

24. The method of claim 23, wherein the orientation of bending is determined based on a plurality of displacement components due to bending.

25. The method of claim 15, wherein the method is performed by a portable device.

26. The method of claim 15, wherein the method is performed by a device that is powerable by DC battery power.

27. The method of claim 15, wherein the method is performed by a device that operates in an absence of AC line voltage.

28. A portable load monitoring system that monitors a load associated with a load carrying member, a plurality of load sensing elements being associated with the load carrying member, the system comprising:
   a voltage divider configured to measure inductance associated with the load sensing elements; and
   a portable computer device configured to:
      determine displacements of the load sensing elements due to the load based on the inductance associated with the load sensing elements, and
      determine the load associated with the load carrying member based on the displacements of the load sensing elements.

29. A system that monitors a load associated with a load carrying member, a plurality of load sensing elements being associated with the load carrying member, the system comprising:
   a DC power source;
   a voltage divider connected to the DC power source and configured to measure inductance associated with the load sensing elements; and
   a computer device connected to the DC power source and configured to:
      determine displacements of the load sensing elements due to the load based on the inductance associated with the load sensing elements, and
      determine the load associated with the load carrying member based on the displacements of the load sensing elements.

30. The system of claim 29, wherein the DC power source includes a battery.

* * * * *